United States Patent [19]

Waltrip

[11] 4,148,339
[45] Apr. 10, 1979

[54] GUIDE MEANS FOR INDICATING CHECK VALVE

[76] Inventor: Hobart Waltrip, 3444 Bonnie Lea Ct., Louisville, Ky. 40216

[21] Appl. No.: 821,603

[22] Filed: Aug. 3, 1977

[51] Int. Cl.² .................. F16K 37/00; F16K 15/02
[52] U.S. Cl. ................................. 137/553; 137/554; 137/543.21
[58] Field of Search ............... 137/553, 554, 543.21; 251/266

[56] References Cited

U.S. PATENT DOCUMENTS

| 1,890,836 | 12/1932 | Webb | 251/266 |
|---|---|---|---|
| 2,638,582 | 5/1953 | Urso et al. | 137/553 X |
| 2,914,088 | 11/1959 | Beaman et al. | 251/266 X |
| 3,896,850 | 7/1975 | Waltrip | 137/540 X |

Primary Examiner—William R. Cline
Attorney, Agent, or Firm—William R. Price

[57] ABSTRACT

Discloses a guide means for an indicating check valve and leak indicator utilized for indicating the position of a valve closure means relative to spaced apart inlet and outlet ports. The invention involves the use of an elongated cylindrical valve chamber having a cylindrical plug member slidably mounted therein and containing a first magnetic means. A second magnetic indicating means situated outside the valve housing and outside the valve chamber moves responsive to the axial movement of the valve closure in said valve chamber. The valve closure means is guided by means of a pin sliding in a groove in the wall of the valve chamber. This guiding means prevents the cylindrical plug valve from spinning around inside the valve chamber during the axial movement between open and closed positions.

2 Claims, 4 Drawing Figures

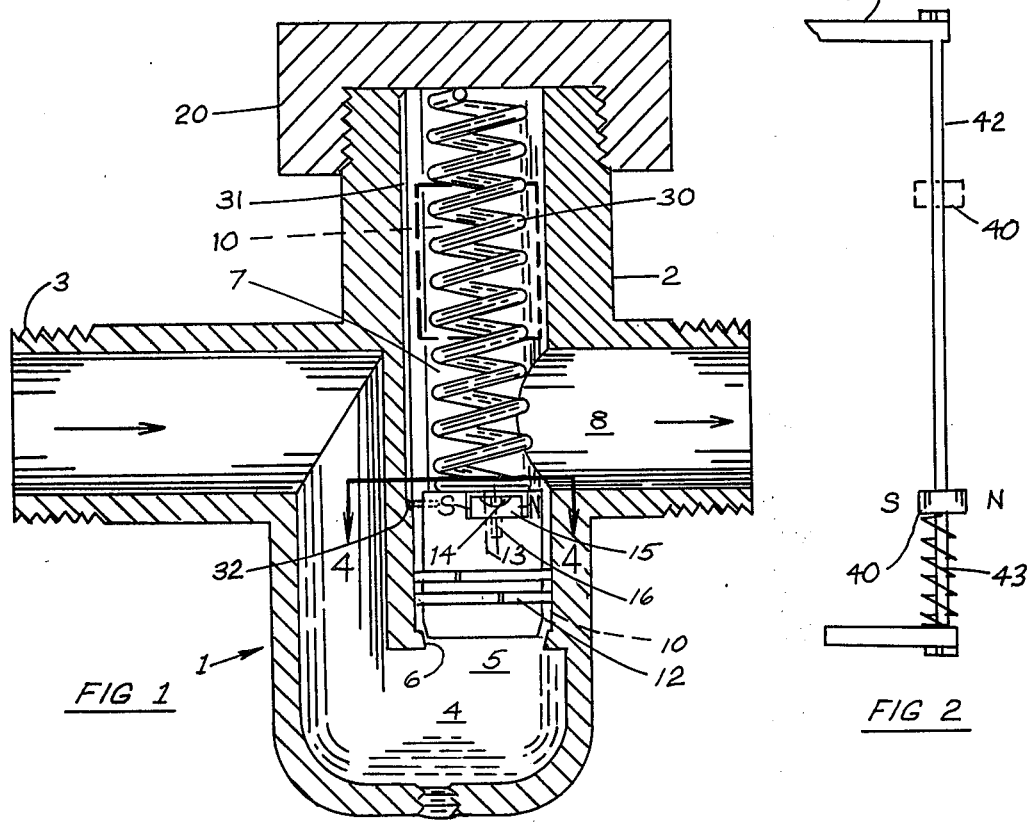
FIG 1
FIG 2
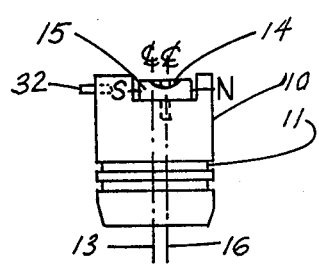
FIG. 3
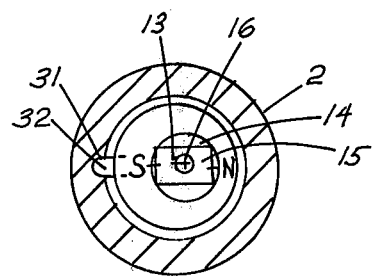
FIG. 4

GUIDE MEANS FOR INDICATING CHECK VALVE

FIELD OF THE INVENTION

This invention relates to valves and specifically to check valves. More specifically, this invention relates to leak indicators used in conjunction with specially designed valves. The leak indicators comprise at least one magnetic member which is completely isolated and separated from the valve chamber itself.

BACKGROUND OF THE PRIOR ART

My previous patent, U.S. Pat. No. 3,896,850, disclosed a check valve and leak indicator in which an elongated valve chamber contained a spring loaded valve closure mounted therein for reciprocating movement between the inlet and outlet ports. The inlet and outlet ports were spaced apart so as to require maximum axial movement to open the outlet port. The magnetic indicating means were situated in the valve closure member itself and outside the valve chamber so as to be responsive to the movement of the cylindrical valve closure plug between its various positions in the valve chamber. Therefore, the magnetic means slidably positioned on a rod or shaft outside the valve housing would indicate the exact position of the valve closure to the operator so as to indicate a full open position, a leaking position or a full closed position. In practice, however, it was found that with a one inch ID valve, it was difficult to find a magnet with sufficient strength to activate the second magnetic indicant means outside the valve body. In order to provide a first magnet with sufficient strength for this purpose it was found necessary to mount the magnet inside the valve chamber of the valve plug off center from the center line of the valve plug and toward the second magnetic means. In many instances this arrangement worked very well, but in some instances spinning of the cylindrical plug would occur due to the offset location of the magnet relative to the center line of the plug. In such instances sometimes the unlike poles of the magnets became out of alignment so as to align like poles toward each other which added to the spinning propensity of the cylindrical plug.

SUMMARY OF THE INVENTION

According to this invention, a guide means is provided for the cylindrical plug within the elongated valve chamber. This guide means in its most simple form is in the form of an elongated guiding groove in the wall of the valve chamber. A pin, or other projection on the side of the cylindrical plug is fitted into the sliding groove so as to maintain the cylindrical plug in a none spinning relation. In this manner, the positioning of the first magnet off center from the center line of the cylindrical plug so as to exert maximum magnetic force to the second magnet slidably mounted on a rod or shaft outside said valve body does not contribute to the propensity of the cylindrical plug to spin in the valve chamber.

BRIEF DESCRIPTION OF THE DRAWINGS

Referring now to the drawings:

FIG. 1 is a sectional view with parts in elevation of the valve of this invention illustrating the valve closure plug in seated position in full lines and in open position in dotted lines.

FIG. 2 is an elevational view of the magnetic indicant of this invention, slidably mounted on a bracket and rod assembly designed for attachment to the exterior surface of the valve body.

FIG. 3 is an elevational view of the cylindrical plug closure means of this invention.

FIG. 4 is a sectional view taken along lines 4—4 of FIG. 1 illustrating the placement of the magnetic means relative to the center line of the plug and relationship of the projecting guide pin in the guide groove of the wall of the valve chamber.

DESCRIPTION OF THE PREFERRED EMBODIMENT

Referring now to the drawings, the valve generally is indicated by 1. Numeral 2 indicates a valve body which has a threaded feed inlet 3 leading to the first chamber 4. The inlet port 5 of the valve chamber 7 is surrounded by an annular valve seat 6. The outlet port 8 it will be noted is located in spaced relation to the inlet port 5 and extends through the side wall of the valve housing 2. The valve closure means 10 is a cylindrical plug which contains a frustoconical truncated portion at its bottom end which registers with the annualar valve seat 6. A set of compression rings 12 fitted in compression grooves 11 act to completely seal the lower portion of the valve chamber until the valve closure reaches the lower level of the outlet port 8. When the valve closure is in the position as shown in phantom lines past the outlet port 8, there is a full flow of fluid through the valve. The top of the valve closure contains a depression 14 which in practice is offset from the center line 13 of plug 10. Thus the center line 16 of the depression 14 is laterally placed relative to the center line 13 of the cylindrical plug 10. This depression is for fitting of the first magnet 15 so that it is in closer proximity to the wall of the valve body 2. A spring 30, biased against cap 20 in the top of plug 10 pushes the valve closure into seated engagement against the annular valve seat 6 at the inlet port 5. Thus as the valve closure means 10 moves from the seated position shown in full lines in FIG. 1 toward the full open position, shown in phantom lines in FIG. 1, it reaches a leaking position wherein the compression rings 12 are past the bottom portion of the outlet port 8. In this position, liquid or fluid can leak through the outlet port undetected. The location of the plug closure means 10 is thus visible by means of an indicant in form of magnet 40 slidably mounted on the rod 42 mounted in bracket members 41. The bracket members are suitably attached to the exterior wall of the valve body 2 with suitable calibration so as to indicate when the valve member 10 has moved from the full closed position into the leaking position wherein fluid is leaked through into the outlet port 8.

As is shown in the drawings, as the valve closure member 10 moves upwardly, the magnet 40 moves responsive to magnet 15 and therefore indicates the exact location of the top of the valve closure 10 at all times. As has previously been indicated, however, in practice it has been difficult to find magnets with sufficient strength to allow the indicant magnet 40 to always move responsively with the valve closure member 10. Therefore, it has been found necessary to offset the depression 14 in which the first magnet 15 is mounted relative to the center line 13 of the plug member 10. In such instances, therefore, the magnetic field between magnet 15 and magnet 40 is increased allowing for corresponding movement between the two magnetic means.

However, due to the turbulent forces within the valve chamber 7 and to the shift of the center of gravity in plug No. 10 due to the offset mounting of magnet 15 in plug No. 10, a spinning force may be applied to cylindrical plug 10, thus bringing the unlike hole of the first magnet 15 out of alignment with the opposite pole of the magnet indicant 40. This causes a repulsion rather than a magnetic attraction intensifying the spin of the cylindrical plug.

This tendency has been stopped by means of a guide means for the cylindrical plug 10. This guide means involves a guide groove 31 which extends in the wall of the valve member 2 extending from the top of the valve chamber 7 to a position slightly below the lower portion of the outlet port 8. A guide pin 32 mounted in the top of the valve closure 10 is fitted into the groove so as to ride therein upon the axial movement of the valve closure plug along the length of the valve chamber 7. By this means, the cylindrical plug 10 is prevented from spinning within the valve chamber 7 and therefore the magnetic indicating means 15 and 40 are in the proper position for magnetic attraction so as to correctly indicate the position of the valve closure 10 at all times within the valve chamber 7. Additionally, there has been provided a light spring 43 encompassing the rod or shaft 42 upon which the magnetic indicant 40 rests. In some instances a sudden burst of steam through the valve tends to push the plug valve member 10 rapidly toward the top, therefore preventing the indicant 40 from moving therewith. The spring member tends to bias the magnetic indicant 40 and urge it upwardly so that it can move rapidly with the plug member 10 in the vertical direction.

It will be obvious to those skilled in the art that if, for example, the magnetic indicant 40 moves against a calibrated background and that the pressure of the inlet line 3 is known and the pressure of the outlet line 8 is known that the device can be used as a flow meter. It is felt, however, that the primary use of the valve and leak indicating means of this invention will be primarily of benefit as a check valve and particularly to indicate small leaks in lines in which such leaks were never before easily detectible.

Many modifications will occur to those persons skilled in the art from the description hereinabove given which is meant to be illustrative in nature and non-limiting except so as to be commensurate in scope with the appended claims.

I claim:
1. A steam valve including:
    A. a valve body comprising:
        1. an elongated valve chamber including:
            a. an inlet port at one end of said chamber,
                1. an annular valve seat surrounding said inlet port,
            b. an outlet port opening in the side wall of said valve chamber at a point in spaced relation to said inlet port and extending through the side wall of said valve body,
    B. an elongated valve closure in the form of a cylindrical plug, said cylindrical plug being fitted in said valve chamber for axial reciprocating movement in said chamber between:
        1. full closed position seated against said annular valve seat,
        2. full open position at a point past said outlet port,
        3. a leaking position wherein said cylindrical plug is past the level of the lowest part of said outlet port thereby allowing a small leak to occur and
        4. at intermediate points therebetween,
    C. a spring mounted in said valve chamber and biased at the top against the top of said valve chamber and at the bottom against said cylindrical plug for urging said cylindrical plug toward said full closed position;
    D. indicator means responsive to the axial movement of said cylindrical plug to visibly indicate the position of said cylindrical plug in said valve chamber, said indicator means comprising:
        1. a first magnet fitted onto said cylindrical plug
            a. said first magnet being fitted onto said cylindrical plug so that the center line of said magnet is offset relative to the center line of said cylindrical plug toward the side wall of said valve body;
        2. an indicant comprising:
            a. a second magnet, slidably mounted outside said valve body within the magnetic field of said first magnet and responsive to the axial movement of said cylindrical plug;
            b. said second magnet being slidably mounted in juxtaposition to said first magnet with the unlike pole of said second magnet disposed toward the unlike pole of said first magnet so that movement of said second magnet responsive to the movement of said cylindrical plug is through magnetic attraction of said first and second magnets,
            c. support means for said second magnet comprising bracket members fitted to the exterior surface of said valve body and a rod mounted in said bracket members for slidably positioning said second magnet,
    E. the further improvement of guide means for said cylindrical plug which includes:
        1. a groove in the wall of said valve chamber extending axially between the upper and lower portions thereof, and
        2. a guide member fitted into said cylindrical plug and sliding in said groove so as to prevent spinning of said cylindrical plug during axial movement thereof.

2. A valve, as defined in claim 1, in which the guide member for said cylindrical plug comprises:
    A. a pin projecting from said cylindrical plug and into said groove.

* * * * *